Figure 1:
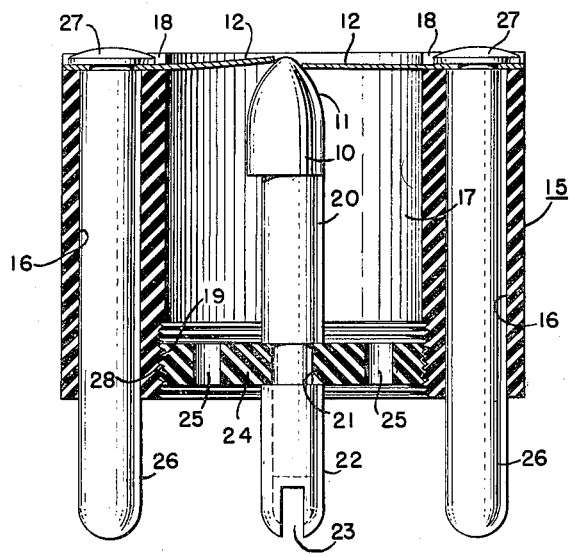

Feb. 5, 1952     E. G. JAMES ET AL     2,584,461

ELECTRICAL CRYSTAL-CONTACT DEVICE

Filed May 10, 1950

*INVENTORS.*
EMRYS G. JAMES
AUBREY O. E. LINDELL
BY

ATTORNEY

Patented Feb. 5, 1952

2,584,461

UNITED STATES PATENT OFFICE 2,584,461

ELECTRICAL CRYSTAL-CONTACT DEVICE

Emrys Gwynne James and Aubrey Oscar Edgar Lindell, Wembley, England, assignors to Hazeltine Research, Inc., Chicago, Ill., a corporation of Illinois Application May 10, 1950, Serial No. 161,124
In Great Britain June 14, 1949

10 Claims. (Cl. 175—366)

The present invention relates to electrical crystal-contact devices and, particularly, to electrical crystal-contact devices which are adjustable at least during the assembly thereof selectably to provide different points of contact between a semiconducting crystal-contact element and individual ones of co-operating metallic-contact elements.

Heretofore, electrical crystal-contact devices for establishing a pair of single points of contact between a crystal-contact element, such as a germanium crystal, and a pair of metallic-contact elements have commonly utilized fine wires a few thousandths of an inch in diameter as the metallic-contact elements. For certain applications for these devices, such as in transistor-type signal repeaters, the spacing of the points of contact substantially affects the repeater characteristics. Hence this spacing must be accurately determined. In prior such devices the physical size of the contact wires and the configurations of the devices have generally caused difficulty in providing during the assembly thereof an accurate selection of the points of contact.

Furthermore, for some purposes it may be desirable to select at will different points of contact and the spacings therebetween. In addition, different pressures at the points of contact may be desired. Prior such devices have generally required permanent establishment of the points of contact. Accordingly, these devices have not been entirely satisfactory for the purposes mentioned.

It is an object of the present invention, therefore, to provide a new and improved electrical crystal-contact device which avoids one or more of the above-mentioned disadvantages of prior such devices.

It is another object of the invention to provide a new and improved electrical crystal-contact device, including a crystal-contact element and a metallic-contact element, which is relatively easy to adjust at least during the assembly thereof selectably to establish a different point of contact between the crystal-contact element and the metallic-contact element at each position of adjustment of the device.

It is a further object of the invention to provide a simple adjustable electrical crystal-contact device, including a crystal-contact element and a pair of metallic-contact elements, which is relatively easy to adjust at least during the assembly thereof selectably to establish a different pair of points of contact between the crystal- contact element and the pair of metallic-contact elements at each position of adjustment of the device and accurately to establish different contact pressures at the different pairs of points of contact.

It is still another object of the invention to provide a novel and easily adjusted electrical crystal-contact device which selectably determines a different pair of points of contact between a crystal-contact element and a pair of metallic-contact elements at each position of adjustment of the device and also accurately determines different spacings between the different points of contact.

In accordance with a particular form of the invention, an electrical crystal-contact device comprises a semi-conducting crystal-contact element including a tapered portion and a metallic-contact element including a portion having a sharp edge conditioned to engage that tapered portion. The device also includes a support for the elements including means adjustable at least during the assembly of said device for maintaining the edge in engagement with the tapered portion to provide a single point of contact therebetween at each position of adjustment of the adjustable means and for providing, at least during said assembly, relative movement between the elements effective to determine the point of contact therebetween at the aforesaid each position of adjustment and to establish the contact pressure at the determined point of contact.

For a better understanding of the present invention, together with other and further objects thereof, reference is had to the following description taken in connection with the accompanying drawing, and its scope will be pointed out in the appended claims.

Figure 3:
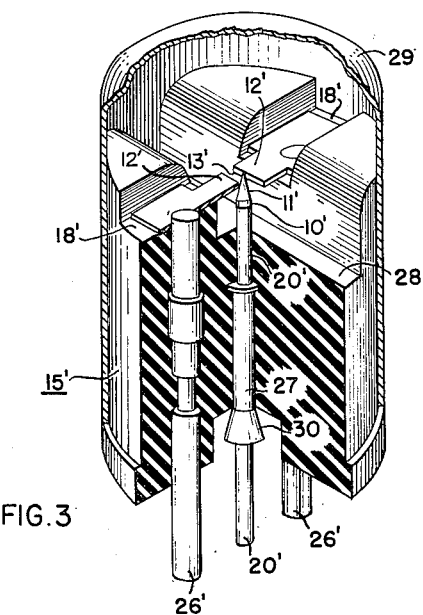
Figure 2:
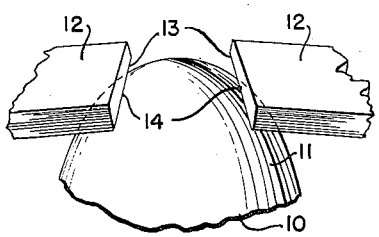

In the drawing, Fig. 1 is a vertical, longitudinal sectional view of an electrical crystal-contact device embodying the present invention in a particular form; Fig. 2 is an enlarged fragmentary view of the various contact elements of the device represented in Fig. 1; and Fig. 3 is a perspective view of a modified device in accordance with the invention, portions of the device being broken away to illustrate details of construction.

*Description of electrical crystal-contact device of Fig. 1*

Referring now more particularly to Fig. 1 of the drawing, the device there represented comprises an adjustable hollow support 15 of suitable insulating material such as polystyrene having a centrally positioned longitudinal bore 17. The support 15 also includes a pair of diametrically opposed longitudinal bores 16, 16 which firmly engage two protruding conductive pins 26, 26 adapted for insertion at one end thereof into a suitable socket (not shown) to establish electrical connection with an external circuit. The pins 26, 26 have heads 27, 27 which anchor one end of each of a pair of relatively thin, flat metallic-contact elements 12, 12 in diametrically disposed shallow slots 18, 18 in the support 15, thus preventing rotation of the elements. The contact elements 12, 12 are preferably made of a resilient, electrically conductive material such as beryllium copper or phosphor bronze and may, if desired, be soldered to the pins 26, 26.

Certain of the details of construction of the contact elements 12, 12 may be seen more clearly in Fig. 2 of the drawing wherein portions of the contact elements and a tapered portion 11 of a semiconducting crystal-contact element 10, such as germanium, are represented to an enlarged scale. The contact elements 12, 12 preferably have at their spaced free ends sharp lower edges 13, 13. These edges are adapted to be maintained in engagement with the tapered portion 11 of the crystal-contact element 10 to provide a single pair of points of contact 14, 14 at the particular position of adjustment represented in the two figures of the drawing.

Referring again to Fig. 1 of the drawing, it will be seen that the tapered or attenuated portion 11 of the crystal-contact element 10 is substantially conical. The element 10 is eccentrically secured to one end of a conductive member or rod 20 by any suitable means such as by soldering. The conductive rod 20, which establishes electrical contact with the crystal-contact element 10, is mounted for relatively free rotation within a bore 21 in a cylindrical supporting member 24, which may be of suitable insulating material such as polystyrene. A hollow metallic shaft 22, the free end of which is adapted for insertion in a suitable socket (not shown) to establish an electrical connection with an external circuit, is press fitted over the lower portion of the conductive rod 20 and prevents longitudinal movement of the rod 20 relative to the supporting member 24. The shaft 22 has a kerf 23 which is adapted to receive a suitable adjusting tool such as a screw driver for rotating the rod 20 and also the crystal-contact element 10. The supporting member 24, which has apertures 25, 25 therein for receiving a suitable adjusting tool, is provided with threads 28 on the periphery thereof for engagement with complementary threads 19 on the lower internal portion of the support 15. The entire crystal-contact device may, if desired, be housed in a conventional protective container (not shown).

*Adjustment of Fig. 1 electrical crystal-contact device*

Considering now the adjustment of the electrical crystal-contact device just described, that device may be adjusted at least during the assembly thereof as presently will be described in detail. Rotation of the cylindrical supporting member 24 in a given direction by means of an adjusting tool inserted in the apertures 25, 25 causes the member 24 to be elevated in the longitudinal bore 17. This in turn elevates the conductive rod 20 and the crystal-contact element 10 but does not cause any rotation thereof thus effecting only a longitudinal adjustment of the position of the element 10. As the element 10 is elevated to a new position of adjustment, it bends the resilient metallic-contact elements 12, 12 slightly and thus increases the pressures at the points of contact between the various contact elements. The spacing between the sharp edges 13, 13 of the metallic-contact elements 12, 12 also increases as the element 10 is elevated. Somewhat analogous operation occurs when the member 24 is rotated in a direction opposite to that previously mentioned. However, such rotation of the member 24 to a new position of adjustment provides a new single pair of points of contact which are more closely spaced than previously and the pressures at the new points of contact are less than those previously established. Thus, the adjustable means including the conductive rod 20, which provides relative linear movement between the crystal-contact element 10 and the metallic-contact elements 12, 12, is effective to determine the pair of points of contact between those elements at each position of adjustment and the spacing between those points of contact, and is also effective to establish the contact pressures at the determined pair of points of contact.

Rotation of the conductive rod 20 within the bore 21 is accomplished by utilizing a screw driver in the kerf 23. Since the crystal-contact element 10 is eccentrically mounted on the conductive member 20, rotation of shaft 22 (by means of a screw driver inserted in the kerf 23) causes eccentric rotational movement of the crystal 10 relative to the metallic-contact elements 12, 12. As the crystal-contact element 10 is rotated to each new position of adjustment, a single new pair of points of contact is determined. This rotation may also alter somewhat the spacing of the edges 13, 13 of the contact elements 12, 12 and may establish new contact pressures at the determined pair of points of contact. Conductive rod 20 thus provides relative eccentric rotational movement between the crystal-contact element 10 and the metallic-contact elements 12, 12, which movement is effective to determine a single pair of points of contact between those elements at each position of adjustment and also is effective to determine the spacing between those points of contact. This movement is further effective to establish the contact pressures at the determined pair of points of contact.

*Description of Fig. 3 electrical crystal-contact device*

Referring now to Fig. 3 of the drawing, the device there represented is generally similar to the Fig. 1 embodiment, similar elements being designated by similar reference numerals primed. The device includes a support comprising a substantially cylindrical block 15' of suitable insulating material having at one end thereof a pair of intersecting diametrical grooves 18', 28. The grooves 18', 28 are disposed normal to each other and normal to the longitudinal axis of the block 15'. The block 15' is preferably molded with a centrally located metallic sleeve 27 and two diametrically opposed conductive pins 26', 26' longitudinally supported in the block 15'. The pins 26', 26' are adapted for insertion at one end thereof into a suitable socket (not shown) to establish electrical connection with an external circuit.

The pins 26', 26' are conductively connected to a pair of metallic-contact elements 12', 12' which are generally similar to the corresponding elements of the Fig. 1 embodiment. The metallic-contact elements 12', 12' each includes a portion having a sharp edge 13', only one of which may be seen in the diagram. The elements 12', 12' are positioned in spaced insulated relation in the groove 18' with the edges 13', 13' in spaced opposing relation. Preferably, the metallic-contact elements 12', 12' are formed by soldering a single relatively thin metal strip to pins 26', 26' and thereafter cutting therefrom a center portion having a width equal to a predetermined distance. The pins 26', 26' thereby maintain the elements 12', 12' in the groove 18' with the edges 13', 13' spaced the aforesaid predetermined distance and also serve electrically to connect the elements 12', 12' to an external circuit.

A crystal-contact element 10' having a tapered portion 11' is conductively connected to a conductive support or rod 20' which is inserted in the metallic sleeve 27, the latter having a flared end 30. Upon insertion of the rod 20' into the sleeve 27, due to manufacturing tolerances the longitudinal axis of the rod 20' may not pass exactly through the center of the opening between the metallic-contact elements 12', 12'. Hence, manufacturing tolerances usually allow two degrees of freedom of adjustment of the rod 20' for adjusting the crystal-contact element 10' during the assembly of the device. Accordingly, during the assembly of the device the rod 20' may be displaced longitudinally within the sleeve 27 and also may be eccentrically rotated about the longitudinal axis of the sleeve 27. After adjustment of the crystal-contact element 10' during the assembly of the device effected by suitable rotational and longitudinal displacement of the rod 20', that rod is preferably soldered to the metallic sleeve 27 by introducing solder into the flared end 30. The lower end of the rod 20' is adapted to be connected to an external electrical circuit.

The crystal-contact element 10' is generally similar to the crystal-contact element 10 of the Fig. 1 embodiment and may be ground to its desired shape, preferably after being soldered to the conductive rod 20'. The axis of the element 10' is preferably aligned with that of the rod. The tapered portion 11' of element 10' is adapted to engage the edges 13', 13' of the metallic-contact elements 12', 12' to provide a single pair of points of contact between the crystal-contact element 10' and metallic-contact elements 12', 12'. The points of contact usually have a spacing substantially equal to the predetermined distance mentioned above. The entire crystal-contact device may be enclosed in a conventional protective container 29.

*Adjustment of Fig. 3 electrical crystal-contact device*

The adjustment of the device represented by Fig. 3 is generally similar to the adjustment of the Fig. 1 embodiment. However, the Fig. 3 embodiment is intended to be adjustable only during the assembly thereof. When the rod 20' is initially inserted in the sleeve 27, due to the previously mentioned manufacturing tolerances the vertex of the crystal-contact element 10' may not be evenly spaced from each of the edges 13', 13' of the metallic-contact elements 12', 12'. Hence, to provide equal pressures at the points of contact between the crystal-contact element 10' and the metallic-contact elements 12', 12', in general it is necessary eccentrically to rotate the rod 20' within the sleeve 27 and about the longitudinal axis thereof. On the other hand, if the pressures at the points of contact are desired to be different, the rod 20' may be eccentrically rotated within the sleeve 27 and about the longitudinal axis thereof to a suitable position in which the vertex of the crystal-contact element 10' is not evenly spaced from the edges 13', 13' of the metallic-contact elements 12', 12'. Accordingly, during the assembly of the device, linear and rotational movements of the rod 20' within the sleeve 27 are effective to establish different pairs of points of contact between the crystal-contact element 10' and the metallic-contact elements 12', 12'. A further explanation of the adjustment of the device is deemed unnecessary.

From the foregoing description of the invention, it will be apparent that an electrical crystal-contact device embodying the invention has the important advantage of two degrees of freedom of adjustment for altering the electrical characteristics of the device. It is another advantage of the invention that a device constructed in accordance therewith is relatively easy to adjust during the assembly thereof accurately to determine the spacing between points of contact and to establish the contact pressures at the determined points of contact.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electrical crystal-contact device comprising: a semiconducting crystal-contact element including a tapered portion; a metallic-contact element including a portion having a sharp edge conditioned to engage said tapered portion; and a support for said elements including means adjustable at least during the assembly of said device for maintaining said edge in engagement with said tapered portion to provide a single point of contact therebetween at each position of adjustment of said means and for providing at least during said assembly relative movement between said elements effective to determine the point of contact therebetween at said each position of adjustment and to establish the contact pressure at said determined point of contact.

2. An electrical crystal-contact device comprising: a semiconducting crystal-contact element including a tapered portion; a resilient metallic-contact element including a portion having a sharp edge conditioned to engage said tapered portion; and a support for said elements including means adjustable at least during the assembly of said device for maintaining said edge in engagement with said tapered portion to provide a single point of contact therebetween at each position of adjustment of said means and for providing at least during said assembly relative movement between said elements effective to determine the point of contact therebetween at said each position of adjustment and to establish the contact pressure at said determined point of contact.

3. An electrical crystal-contact device comprising: a semiconducting crystal-contact element including an attenuated portion; a metallic-contact element including a portion having a sharp edge conditioned to engage said attenuated portion; and a support for said elements including means adjustable at least during the assembly of said device for maintaining said edge in engagement with said attenuated portion to provide a single point of contact therebetween at each position of adjustment of said means and for providing at least during said assembly relative movement between said elements effective to determine the point of contact therebetween at said each position of adjustment and to establish the contact pressure at said determined point of contact.

4. An electrical crystal-contact device comprising: a semiconducting crystal-contact element including a substantially conical portion; a metallic-contact element including a portion having a sharp edge conditioned to engage said conical portion; and a support for said elements including means adjustable at least during the assembly of said device for maintaining said edge in engagement with said conical portion to provide a single point of contact therebetween at each position of adjustment of said means and for providing at least during said assembly relative movement between said elements effective to determine the point of contact therebetween at said each position of adjustment and to establish the contact pressure at said determined point of contact.

5. An electrical crystal-contact device comprising: a semiconducting crystal-contact element including a tapered portion; a pair of metallic-contact elements, each including a portion having a sharp edge conditioned to engage said tapered portion; and a support for said elements including means adjustable at least during the assembly of said device for maintaining said edges in engagement with said tapered portion to provide a single pair of points of contact therebetween at each position of adjustment of said means and for providing at least during said assembly both relative linear and rotational movement between said crystal-contact element and said metallic-contact elements effective to determine the pair of points of contact therebetween at said each position of adjustment and to establish the contact pressures at said determined pair of points of contact.

6. An electrical crystal-contact device comprising: a semiconducting crystal-contact element including a tapered portion; a pair of metallic-contact elements, each including a portion having a sharp edge conditioned to engage said tapered portion; and a support for said elements including means adjustable at least during the assembly of said device for maintaining said edges in engagement with said tapered portion to provide a single pair of points of contact therebetween at each position of adjustment of said means and for providing at least during said assembly both relative linear and rotational movement between said crystal-contact element and said metallic-contact elements effective to determine the pair of points of contact therebetween at said each position of adjustment and the spacing between said points of contact of said determined pair of points of contact and to establish the contact pressures at said determined pair of points of contact.

7. An electrical crystal-contact device comprising: a semiconducting crystal-contact element including a tapered portion; a pair of resilient metallic-contact elements, each including a portion having a sharp edge conditioned to engage said tapered portion; and a support for said elements adjustable at least during the assembly of said device, for maintaining said edges in engagement with said tapered portion to provide a single pair of points of contact therebetween at each position of adjustment of said support, including a first means for providing at least during said assembly eccentric rotational movement between said crystal-contact element and said metallic-contact elements and including a second means for providing at least during said assembly linear movement therebetween, said movements being effective to determine the pair of points of contact between said crystal-contact element and said metallic-contact elements at said each position of adjustment and to establish the contact pressures at said determined pair of points of contact.

8. An electrical crystal-contact device comprising: a semiconducting crystal-contact element including a tapered portion; a pair of resilient metallic-contact elements, each including a portion having a sharp edge conditioned to engage said tapered portion; and an adjustable support for said elements, for maintaining said edges in spaced relationship with each other and in engagement with said tapered portion to provide a single pair of points of contact therebetween at each position of adjustment of said support, including a conductive member rotatably mounted in said support for providing eccentric rotational movement between said crystal-contact element and said metallic-contact elements and including means including said conductive member for providing linear movement between said crystal-contact element and said metallic-contact elements, said movements being effective to determine the pair of points of contact between said crystal-contact element and said metallic-contact elements at said each position of adjustment and to establish the contact pressures at said determined pair of points of contact.

9. An electrical crystal-contact device comprising: a block of insulating material having at one end thereof a pair of intersecting transverse grooves disposed normal to each other and normal to the longitudinal axis of said block; a pair of resilient metallic-contact elements, each including a portion having a sharp edge, positioned in spaced insulated relation in one of said grooves; conductive means supported by said block and conductively connected to said metallic-contact elements for maintaining said elements in said one of said grooves with said edges spaced a predetermined distance and for electrically connecting said elements to an external circuit; a semiconducting crystal-contact element including a tapered portion adapted to engage said edges of said metallic-contact elements to provide a single pair of points of contact between said crystal-contact element and said metallic-contact elements in which said points of contact have a spacing substantially equal to said predetermined distance; and a conductive support conductively connected to said crystal-contact element and supported by said block for electrically connecting said crystal-contact element to said external circuit.

10. An electrical crystal-contact device comprising: a substantially cylindrical block of insulating material having at one end thereof a pair of intersecting diametrical grooves disposed normal to each other and normal to the longitudinal axis of said block; a pair of resilient metallic-contact elements, each including a portion having a sharp edge, positioned in one of said grooves with said edges in spaced opposing relation; a pair of conductive pins longitudinally supported in said block and conductively connected to said pair of metallic-contact elements for maintaining said elements in said one of said grooves with said edges spaced a predetermined distance and for electrically connecting said elements to an external circuit; a semi-conducting crystal-contact element including a tapered portion adapted to engage said edges of said metallic-contact elements to provide a single pair of points of contact between said crystal-contact element and said metallic-contact elements in which said points of contact have a spacing substantially equal to said predetermined distance; and a conductive support conductively connected to said crystal-contact element and supported by said block for electrically connecting said crystal-contact element to said external circuit.

EMRYS GWYNNE JAMES.
AUBREY OSCAR EDGAR LINDELL.

REFERENCES CITED

The following references are of record in the file of this patent:

UNITED STATES PATENTS

| Number | Name | Date |
|---|---|---|
| 756,676 | Midgley | Apr. 5, 1904 |

FOREIGN PATENTS

| Number | Country | Date |
|---|---|---|
| 21,408 | Great Britain | Sept. 26, 1907 |
| 599,341 | Great Britain | Mar. 10, 1948 |